March 25, 1969    R. N. QUENNEVILLE    3,434,365
GEAR ALIGNMENT MEANS
Filed June 13, 1967
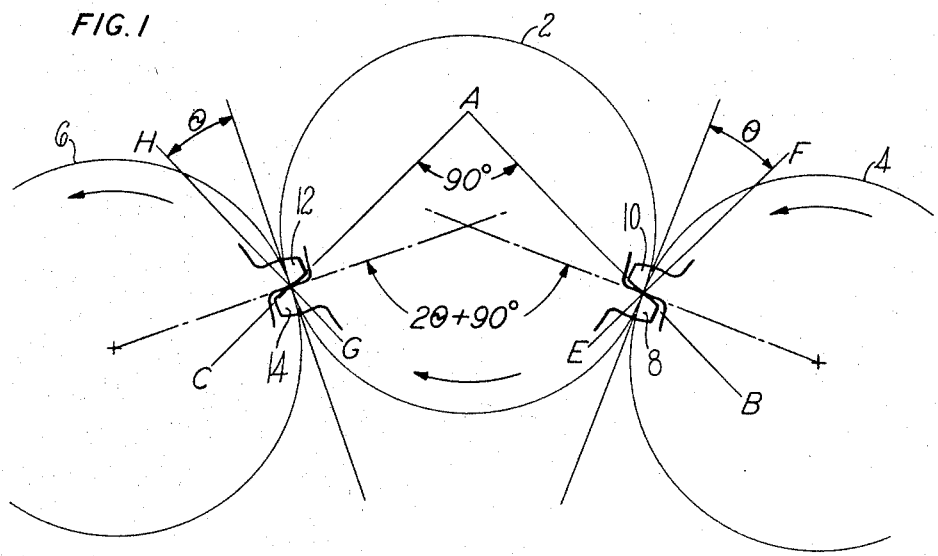
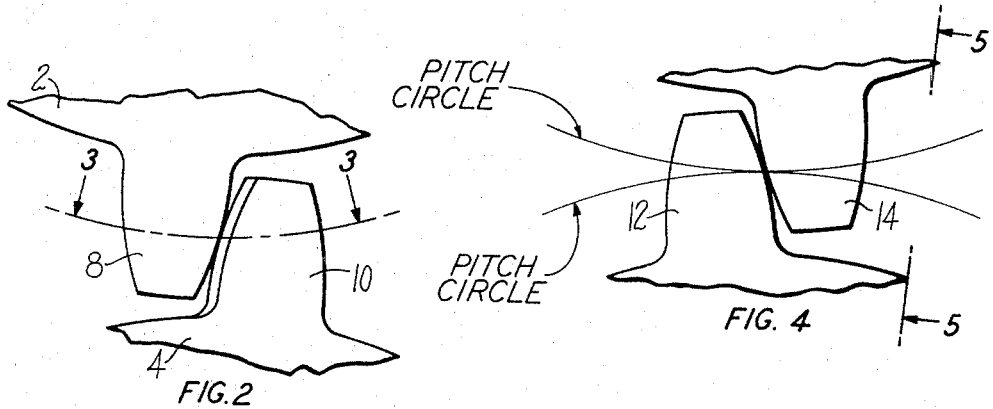
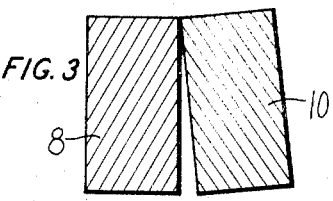
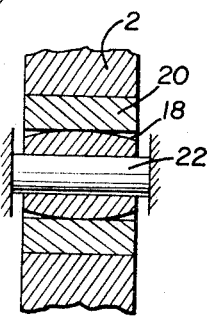
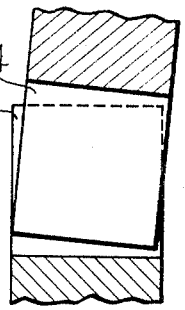
INVENTOR.
RAYMOND N. QUENNEVILLE
BY *Lawrence A. George*
AGENT 3,434,365
GEAR ALIGNMENT MEANS Raymond N. Quenneville, Suffield, Conn., assignor to United Aircraft Corporation, East Hartford, Conn., a corporation of Delaware
Filed June 13, 1967, Ser. No. 645,692
Int. Cl. F16h 57/02
U.S. Cl. 74—410              8 Claims

ABSTRACT OF THE DISCLOSURE

An idler gear is pivotally mounted on bearings between a drive gear and a driven gear for meshing therewith such that the angle formed by the intersection of the pressure line through the mesh between the idler gear and the drive gear and the pressure line through the mesh between the idler gear and the driven gear is substantially ninety degrees (90°).

---

The invention described and claimed herein resulted from work done under U.S. Government contract number FA–SS–66–5; the U.S. Government has an irrevocable, nonexclusive license under this application to practice and have practiced the invention claimed herein, including the unlimited right to sublicense others to practice and have practiced the claimed invention for any purpose whatsoever.

BACKGROUND OF THE INVENTION

Field of the invention

This invention relates to gear alignment means and particularly to alignment means for a gear which must mesh in aligned relationship with two other gears.

Description of the prior art

In the prior art the usual method of preventing the misalignment of meshing gears with respect to each other is to support the gears with rigid structure which does not permit any movement of the gears, and to manufacture the gear support structure to close tolerances. The prior art gearings systems are, therefore, of great weight and size due to the rigid structure, and costly due to the close tolerances necessarily maintained in the manufacture. My invention overcomes these undesirable factors in gear assemblies.

SUMMARY OF THE INVENTION

The primary object of the present invention is to provide an idler gear for meshing with a drive gear and a driven gear, which is capable of aligning itself with both the drive gear and the driven gear should the drive gear or the driven gear, or both, become misaligned.

Another object of the present invention is to provide a path for the transmission of power through a gear train which is not subject to gear tooth end loading with resultant tooth failure due to the misalignment of one gear relative to the gear with which it meshes.

In accordance with the present invention, there is provided an idler gear, mounted between two gears, adapted to align itself with both the gears should one or both of the gears become misaligned.

More particularly, gear alignment means for an idler gear are provided by the combination of an idler gear and means for pivotally mounting the idler gear between the drive gear and the driven gear for meshing therewith, such that a perpendicular to the pressure line through the point of contact of the idler gear tooth and the drive gear tooth is parallel to the pressure line through the point of contact of the idler gear tooth and the driven gear tooth. By so positioning the idler gear, it can be seen that, therefore, a perpendicular drawn through the point of contact of the idler gear tooth and the driven gear tooth will, of necessity, be parallel to the pressure line through the point of contact between the idler gear tooth and the drive gear tooth.

The foregoing and other objects, features and advantages of the present invention will become more apparent in the light of the following detailed description of a preferred embodiment thereof, as is illustrated in the accompanying drawings.

DESCRIPTION OF THE DRAWINGS

FIG. 1 is a diagrammatic illustration of an exemplary embodiment of an idler gear mounted between a drive gear and a driven gear for self-alignment therewith in accordance with the present invention.

FIG. 2 is an enlarged view showing two gear teeth in point contact, a situation which occurs the instant the drive gear or the driven gear becomes misaligned. FIG. 2 also depicts the situation which would exist (if the invention as taught is not practiced) between the idler gear tooth and the tooth of the gear which became misaligned.

FIG. 3 is a section view along line 3—3 of FIG. 2.

FIG. 4 is an enlarged illustration of two gear teeth in contact showing the mesh between the idler gear tooth and the tooth of the gear which is not misaligned, after the idler gear has aligned itself with the misaligned gear. FIG. 4 also depicts the relationship between the idler gear teeth and the teeth of both other gears in the case where both gears become misaligned.

FIG. 5 is an auxiliary view taken from line 5—5 of FIG. 4.

FIG. 6 is a schematic illustration of an example of means for pivotally mounting the idler gear.

DESCRIPTION OF THE PREFERRED EMBODIMENT

Referring now to FIG. 1, there are shown three spur gears in meshing relationship: an idler gear 2 meshing with a drive gear 4 and a driven gear 6. The idler gear 2 is pivotally mounted between gears 4 and 6. The pivotal mounting means may be any one of many suitable designs known in the art. Reference is made, for example, to Patent No. 3,309,936, issued to L. L. Gaubis, and especially to FIG. 3 thereof, showing typical means for pivotally mounting a gear. The pivotal mounting means allow the idler gear free movement out of plane in a range dictated by the particular design of the pivotal mounting means utilized. The symbol $\theta$ represents the pressure angle, i.e., the angle between the pressure line and the tangent to the gears through their point of contact.

Misalignment of either the drive gear or the driven gear, or both, could be caused by thermal expansion of the housing in which they are mounted, for instance. The problem which the teachings of the invention solves is that the idler gear must maintain its alignment with both the drive gear and the driven gear in order to effectively transmit power from one gear to the other without suffering wear and ultimate failure of the gear teeth due to misalignment. The essence of the invention is locating the idler gear as shown in FIG. 1. That is, the idler gear is positioned between drive gear 4 and driven gear 6 such that a perpendicular AB to the pressure line EF through the point of contact at the mesh between idler gear 2 and drive gear 4 will be parallel to the pressure line GH through the point of contact of the mesh between the idler gear 2 and the driven gear 6. In this relationship it will be seen that when the idler gear is so placed, a perpendicular AC to the pressure line GH through the point of contact of the mesh between the idler gear 2 and the driven gear 6 will likewise be parallel to the pressure line EF through the point of contact of the mesh between the idler gear 2 and the drive gear 4. This relationship is essential for reasons hereinafter described.

FIG. 6 shows, schematically, a way to provide an idler gear 2 to move out of plane in any direction as will be disposed on the outer race 20 of a roller bearing 18. The roller bearing, which may be a crowned roller bearing or a spherical roller bearing, for example, is grounded via a shaft 22 and, therefore, is fixed. This allows the idler gear 2 to move out of plane in any direction as will be explained hereinafter. Other types of pivotal mounting means well known in the art may also be used.

The invention will now be described by explaining the motion of the idler gear in three possible cases of gear misalignment:

The first case is one in which either the drive gear or the driven gear becomes misaligned, with the other gear remaining in its original plane. The second case is when both the drive gear and the driven gear become misaligned by moving out of plane in the same direction; and the third case is that in which both the drive gear and the driven gear become misaligned, but in which the drive gear moves out of plane in one direction and the driven gear moves out of plane in a different direction or, in other words, when the angle of misalignment between the drive gear and the driven gear is compound.

*First case*

It will be assumed, for example, in this case, that the drive gear 4 becomes misaligned by moving out of plane with the top of drive gear 4, as shown in FIGURE 1, moving into the paper. When this occurs, the relationship between the gear tooth 8 on the idler gear 2 and the gear tooth 10 on drive gear 4 will be as shown in FIGURES 2 and 3. However, since the idler gear 2 is pivotally mounted, the point contact of the teeth, as shown in FIGURE 3, and the unequal tooth loading which results therefrom, will cause the idler gear 2 to align itself with drive gear 4. When this occurs, the idler gear, in aligning itself with drive gear 4, rotates about line AB since it is perpendicular to the pressure line EF and through the point of contact. When the idler gear so rotates, it will be observed that the tooth 14 of idler gear 2 which is meshing with tooth 12 of driven gear 6 will realign in a sliding displacement to a slightly skewed position as shown best in FIG. 5. When tooth 14 slides to a slightly skewed alignment with tooth 12, there is provided a line contact over much of the tooth width and there is no point contact, as shown in FIG. 3. Thus, there is no excessive tooth loading at the mesh between tooth 14 and tooth 12.

*Second case*

Let it be assumed that both drive gear 4 and driven gear 6 become misaligned in the same direction. For purposes of this example it will be assumed that the gears 4 and 6, as shown in FIG. 1, deflect in such a manner that the top of the gears 4 and 6 move out of plane into the paper. If both gears deflect the same amount, idler gear 2 will pivot about its pivotal mount and rotate in equal distance about line AB and about line AC. Thus, both the mesh between the tooth 8 and the tooth 10 and the mesh between tooth 14 and tooth 12 will assume a slightly skewed position as shown best in FIG. 5. A line contact over much of the tooth width is again provided, and there is no unequal tooth loading which would result in tooth failure. If, for instance, driven gear 6 becomes misaligned to a greater degree than drive gear 4, the idler gear 2 would rotate about line AC a greater amount than it would about line AB.

*Third case*

Let it be assumed that drive gear 4 and driven gear 6, as shown in FIG. 1, become misaligned in opposite directions. For purposes of this example, it will be assumed that drive gear 4 deflects in such a manner that the top of gear 4 moves out of plane into the paper, and that gear 6 deflects in such a manner that the top of gear 6 moves out of the paper. In this situation, the angle of misalignment between the two drive gears is compound. Idler gear 2 aligns itself by rotating about lines AB and AC. Thus, both the mesh between the tooth 8 and the tooth 10 and the mesh between tooth 14 and tooth 12 will assume a slightly skewed position, as shown best in FIG. 5. A line contact over much of the tooth width is again provided, and there is no unequal tooth loading which would result in tooth failure.

While the embodiment shown depicts the optimum and, therefore, preferred gear arrangement for providing perfect gear alignment, it is within the spirit and scope of my invention to apply the teachings thereof to gear arrangements other than the one shown in the preferred embodiment. For example, the teachings of my invention may be applied to three gears having their centers on a straight line. Although the alignment will not be perfect as in the preferred embodiment, it will be obvious to one skilled in the art that the gear meshes will be without significant tooth end loading, and thus an advance over those gearing systems known in the art.

There has thus been described a preferred embodiment of idler gear alignment means in accordance with the present invention. It will be obvious to anyone skilled in the art that the teachings of this invention may be used to advantage in any situation where it is necessary to provide an idler gear which must align itself with two other gears. Therefore, it should be understood by those skilled in the art that various changes and omissions in the form and detail thereof may be made therein without departing from the spirit and scope of the invention, which is to be limited only as set forth in the following claims.

What I claim as new and desire to secure by Letters Patent of the United States is:

1. Gear alignment means, comprising:
  a drive gear;
  a driven gear; and
  an idler gear disposed between said drive gear and said driven gear in meshing relationship therewith, said idler gear being pivotally mounted and so located that the perpendicular to the pressure line through the point of tooth contact at the mesh between said idler gear and said drive gear is substantially parallel to the pressure line through the point of tooth contact at the mesh between said idler gear and said drive gear whereby said idler gear pivots out of plane in response to misalignment of either said drive gear or said driven gear.

2. Mounting means for an idler gear adapted for self aligning itself with a drive gear and a driven gear in response to misalignment of either the drive gear or the driven gear, or both, comprising:
  said idler gear being pivotally mounted and disposed in meshing relationship with said drive gear and said driven gear so that the pressure line through the point of contact of the idler gear tooth and the driven gear tooth is substantially perpendicular to the pressure line through the point of contact of the idler gear tooth and the driven gear tooth whereby said idler gear pivots out of plane in response to the misalignment of either said drive gear or said driven gear, or both gears.

3. Gear alignment means as recited in claim 2, wherein said idler gear, said drive gear and said driven gear are spur gears having involute profile gear teeth.

4. Gear alignment means, comprising:
  a drive gear;
  a driven gear; and
  an idler gear pivotally mounted in meshing relationship with said drive gear and said driven gear so that the angle formed by the intersection of the perpendicular to the pressure line through the mesh between said idler gear and said drive gear and the perpendicular to the pressure line through the mesh between said idler gear and said driven gear is substantially equal to 90° whereby said idler gear rotates about the perpendicular to the pressure line through the mesh between said idler gear and said drive gear in response to misalignment of said drive gear.

5. Gear alignment means, comprising:
a drive gear;
a driven gear; and
an idler gear pivotally mounted in meshing relationship with said drive gear and said driven gear so that the perpendicular to the pressure line through point of contact of the idler gear tooth and the drive gear tooth is substantially perpendicular to the perpendicular to the pressure line through the point of contact of the idler gear tooth and the driven gear tooth whereby said idler gear rotates about the perpendicular to the pressure line through the point of contact of the idler gear tooth and the driven gear tooth in response to misalignment of said driven gear.

6. Gear alignment means, comprising:
a drive gear;
a driven gear; and
an idler gear pivotally mounted in meshing relationship with said drive gear and said driven gear such that the angle formed by the intersection of the perpendicular to the pressure line through the mesh between said idler gear and said drive gear and the perpendicular to the pressure line through the mesh between said idler gear and said driven gear is substantially 90° whereby said idler gear rotates about the perpendicular to the pressure line through the mesh between said idler gear and said drive gear and said idler gear rotates about the perpendicular to the pressure line through the mesh between said idler gear and said driven gear in response to misalignment of both said driven gear and said drive gear.

7. Gear alignment means, comprising:
a drive gear;
a driven gear; and
an idler gear pivotally mounted in meshing relationship with said drive gear and said driven gear, said idler gear being so located between said drive gear and said driven gear that the angle formed by the intersection of the line connecting the center of the drive gear and the center of the idler gear and the line connecting the center of the driven gear and the center of the idler gear is substantially equal to twice the pressure angle plus 90° ($2\theta + 90°$).

8. Gear alignment means, comprising:
a drive gear;
a driven gear; and
a pivotally mounted idler gear disposed between said drive gear and said driven gear in meshing relationship therewith, said idler gear being so located that in response to the misalignment of either said drive gear or said driven gear said idler gear pivots about a line which is substantially perpendicular to the pressure line through the mesh between said idler gear and the misaligned gear.

References Cited
UNITED STATES PATENTS

| | | | |
|---|---|---|---|
| 3,036,475 | 5/1962 | Haupt | 74—410 |
| 3,064,490 | 11/1962 | Sigg | 74—410 |
| 3,178,966 | 4/1965 | Wildhaber | 74—410 X |
| 3,180,169 | 4/1965 | Wildhaber | 74—410 |
| 3,309,936 | 3/1967 | Gaubis | 74—410 |

DONLEY J. STOCKING, *Primary Examiner.*

LEONARD H. GERIN, *Assistant Examiner.*